April 3, 1962 — E. BUTTEMEIER — 3,027,676
FISHHOOK EXTRACTING MEANS
Filed Aug. 17, 1959
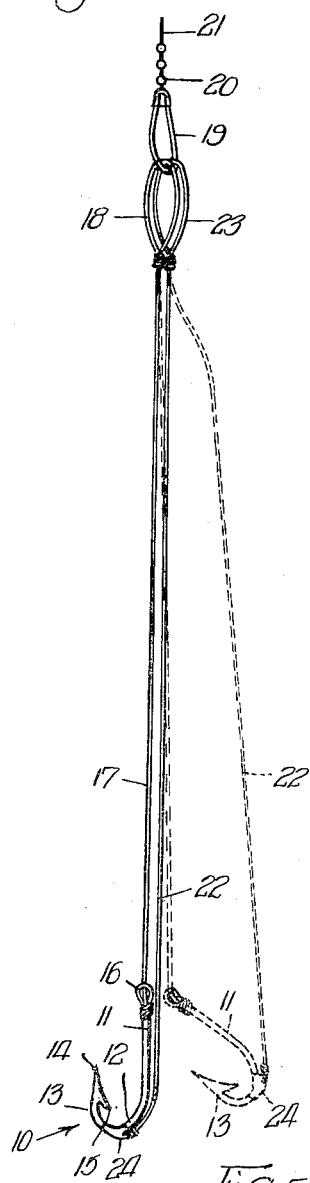
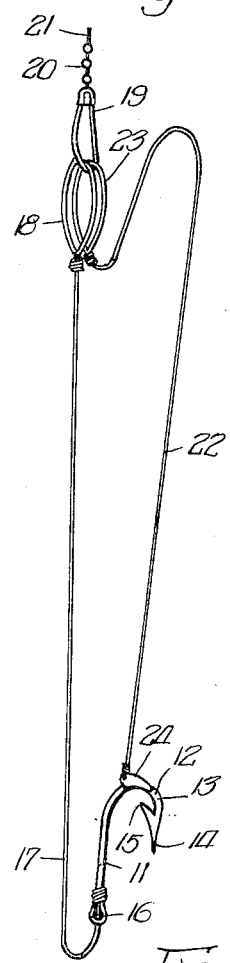
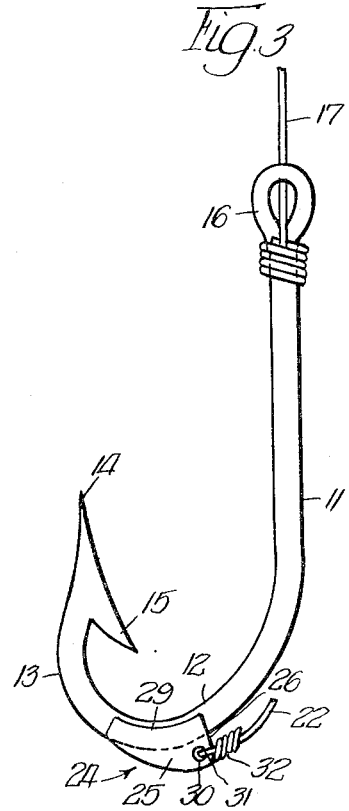
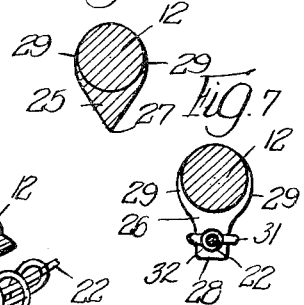
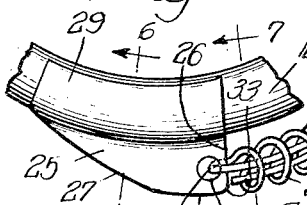
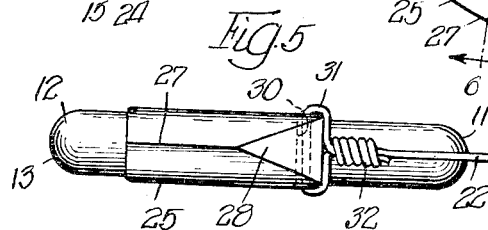
INVENTOR.
Earl Buttemeier
BY B. Pelechowicz
Atty.

United States Patent Office 3,027,676
Patented Apr. 3, 1962

3,027,676
FISHHOOK EXTRACTING MEANS
Earl Buttemeier, 4411 N. Greenview Ave., Chicago 40, Ill.
Filed Aug. 17, 1959, Ser. No. 834,234
2 Claims. (Cl. 43—43.16)

The present invention relates to fishhooks, and has for its main object the provision of means whereby the fishhook may be easily removed from its engagement with the tissues of the body of the fish when the fish has been caught.

It is a known fact that when a fishhook has embedded itself deeply in the fish body, in cases where the fish has swallowed the hook, it is often impossible to dislodge or remove the hook, short of forcibly pulling the hook out of the fish, by pulling the leader, cable or line to which the hook has been attached, with the result of tearing the body of the fish and thereby killing it. Therefore one of the principal objects of the present invention is the provision of suitable means whereby the fishhook, engaged with the body of a fish, may be bodily swung or turned along the longitudinal axis of the hook in order to disengage the same from the fish body and thereupon withdraw it from the mouth of the fish.

Another object of the present invention is the provision of a fixture in a rigid association with and extending from the outer peripheral portion of the bight of the hook, whereby one end of an auxiliary line may be supported upon a central plane with relation to the transverse axis of the fishhook, so that when a manual pull is applied to the said auxiliary line, in a longitudinal direction, the hook may be angularly swung upon its transverse axis and without any undue deviation of the hook from its longitudinal plane, for the purpose of dislodging the hook barb from its engagement with the fish body tissues, and that when the pull upon said auxiliary line is continued to be applied, the hook proper and its barb may be withdrawn from their engagement with the fish body tissues and ultimately withdrawn through the fish mouth.

A still further object of the present invention is the provision of a suitable hinge connection between one end of the auxiliary line and the fixture aforesaid, capable of maintaining the said end of the auxiliary line upon a central plane with relation to the transverse axis of the fishhook, for satisfying the objects hereinabove specified and which hinge connection may permit angular shifting of the auxiliary line with relation to the longitudinal axis of the fishhook as the pull upon the auxiliary line is applied.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several views:

FIG. 1 is a side elevational view of a conventional fishhook, with one end of which the usual gut, leader or the like is connected by one of its ends, with the opposite end of the gut or leader connected with a conventional swivel eye or clasp, further illustrating an auxiliary gut or leader connected with an attachment at the bight portion of the hook and the said eye or clasp, the view further illustrating in dotted lines the initial swung position of the hook at the inception of the application of pulling force to the said auxiliary gut or leader, preparatory to the complete disengagement of the hook from the fish body;

FIG. 2 is a similar view, illustrating the ultimate position of the hook when the same has been fully disengaged from the body tissues of a fish, as a result of the pulling force applied to the said auxiliary gut or leader, preparatory to the withdrawal of the hook from the fish through its mouth;

FIG. 3 is an enlarged side elevational view of a fishhook with the attachment or fixture with which one end of the auxiliary gut or leader is operatively connected;

FIG. 4 is an enlarged fragmentary side elevational view of the bight portion of the hook with the attachment or fixture for supporting one end of the auxiliary gut or leader in an operative position therewith;

FIG. 5 is a bottom elevational view of the bight portion of the hook with the said attachment or fixture and one end of the auxiliary gut or leader in an operative position therewith;

FIG. 6 is a cross sectional view taken on line 6—6 of FIG. 4; and

FIG. 7 is a cross sectional view, taken on line 7—7 of FIG. 4.

Referring in detail to the present drawing there is shown therein a conventional fishhook, indicated by 10 in FIG. 1, which includes shank 11, bight 12, hook portion 13, having its free end sharpened to point 14, and an inwardly directed barb 15 integrally formed with the hook portion 13. The free end of shank 11 has an integrally formed eye 16 with which one end of gut, line or leader 17 connects. The opposite end of said gut 17 is provided with eye 18 which is strung in clasp 19 supported upon swivel 20 with which fish line 21 connects.

The hereinabove described parts define a conventional fishing tackle.

The present invention includes a gut line 22, or the like, one end of which is provided with eye 23 supported by clasp 19. The opposite end of said gut line 22 is connected with an attachment or fixture, generally indicated by 24 in FIGS. 1, 2 and 3.

The said attachment 24 includes an oblong body portion 25, narrower at its end which is proximate to the hook portion 13 of the fishhook 10, and the bottom perimeter which gradually flares away from said hook portion 13, and defines a blunt end 26, which is proximate to shank 11. Said body 25, at its bottom, adjacent the end thereof which is proximate to the hook portion 13 has its side walls tapered for defining a sharp point 27, as seen in FIGS. 5 and 6. The bottom portion of said body 25, adjacent its opposite, blunt end 26 is filed to define a flat surface 28, as seen in FIGS. 5 and 7. Said point 27 and flat surface 28 are curved to conform to the flaring arc defined by the lower edge of said body 25.

Integrally formed with said body 25, and extending from the sides thereof is a pair of leaves 29, curving towards each other. The inner peripheral arcuate surfaces of said leaves 29 merge with a complementary inner peripheral surface of said body 25 for defining a cradle within which the bight portion 12 of the fishhook is receivable. The cradle defined by said leaves 29 and the inner peripheral surface of said body 25 is upon a longitudinal arc to conform with the longitudinal arc of said bight portion 12 so that said leaves 29 and the contacting body portion of said body 25 may snugly contact in an embracing relation the adjacent peripheral portion of said bight 12, as is clearly seen in FIGS. 6 and 7.

If said attachment or fixture 24 is made separately from hook 10, subject to the attachment thereof with existing hooks, in that event it is preferable that said leaves 29 should be sufficiently deflected from each other in order to define by their free edges a space conforming to the transverse diameter of the bight portion of the hook, through which space the bight 12 may be inserted within said leaves 29. Upon insertion thereof said leaves 29 may then be pressed towards each other by pincers or any suitable instrument so as to frictionally engage the diametrically opposed portions of the bight 12 for rigidly connecting said attachment 24 with the bight 12 of the hook.

As an alternative to leaves 29, the latter may be substituted by brazing or soldering material whereby the body 25 of attachment 24 may be rigidly affixed to bight 12 of the hook.

Thus, with the existing fishhooks attachment 24 may be rigidly connected therewith either by pinching said leaves 29 towards each other so as to impinge the bight portion of the hook therebetween, or in the alternative the said attachment may be rigidly affixed to the hook by means of brazing or soldering. In connection with hooks made of hard steel attachment 24 may be fashioned as an integral part of the hook during the manufacturing processes thereof.

Adjacent its blunt end 26, proximate to shank 11 of the hook, said body 25 is provided with a transverse aperture 30, for reception therewithin of eye 31 made in the opposite end of gut or line 22. The end of said line 22 which was passed through said aperture 30 is coiled, as at 32, around the portion of the body of said line which remains outwardly of the blunt end 26 of said body 25 of attachment 24. Note is made of the fact that coil 32 and line 22 extending therefrom are positioned at a point which is central with relation to the transverse plane extended through bight 12 of the fishhook. When said coil 32 is formed in a sufficiently snug relation with the body of line 22 with which the former is in an engagement, this central relation of line 22 with respect to the hook will remain throughout the entire life of use of said auxiliary line 22, particularly when the latter is made of stiff material such as gut.

When fish has swallowed the hook or when the hook has embedded itself deeply in the tissues of the fish body, the withdrawal of the hook by normal means, such as by pulling upon the conventional line 17, is not only a tedious process, but usually results in tearing the tissues and the consequent killing of the fish. The manual pull imparted to the auxiliary line 22 obviates the undesirable results mentioned. The pull imparted to the said auxiliary line 22 causes angular turning of bight 12 and of the hook portion 13 about the transverse axis of the fishhook or the fulcrum defined by the point of juncture of the said auxiliary line 22 with the said attachment 24, or more specifically by the portion of eye 31 located in the aperture 30. Simultaneously with the angular turning of the hook portion 13 a pull upon the latter is imparted in a longitudinal relation therewith, and in the direction away from the sharp point 14 of the hook. Both actions are illustrated in dotted lines in FIG. 1 and in full lines in FIG. 2. At the inception of the pulling action upon the auxiliary line 22 the primary purpose is to impart to the hook portion 13 an angularly shifted relation thereof with the fish body tissues, in the direction away from the sharp point of barb 15, resulting in the disengagement of the said barb with the tissues of the fish body. This action may be visualized on reference to the dotted line showing in FIG. 1. As said angular turning of the bight 12 and the hook portion 13 progresses, the pull upon the hook portion 13 in the longitudinal direction therewith and away from the sharp point 14, is enhanced, ultimately resulting in the complete withdrawal of the hook portion 13 and barb 15 from the fish body tissues, as seen in FIG. 2.

For the best results, it is important that the end of said auxiliary line 22, leaving said attachment 24 should be upon a point which is central with relation to the horizontal transverse plane extended through said blunt end 26 of said attachment 24, thereby locating the point of juncture of said auxiliary line 22 with said attachment 24 upon a plane extended through the longitudinal axis of fishhook 10. This arrangement of said auxiliary line 22 with relation to the fishhook will cause the fishhook to shift along the longitudinal axis thereof when a pull is imparted to the said auxiliary line 22, thereby obviating any lateral deviation of the hook portion 13 and barb 15, notwithstanding any possible angular juxtaposition of the said auxiliary line 22 with relation to the longitudinal plane of the hook when pull is applied to the said auxiliary line. This arrangement will facilitate perfect dislodgement of the hook and of the barb from the fish body tissues and the ultimate withdrawal thereof cleanly and without tearing of the tissues.

It is further observed that as the hook dislodgement and withdrawal process continues on application of the pulling force upon the said auxiliary line 22, the latter gradually assumes a perpendicular relation with the bight 12, which action is permitted by eye 31 which acts as a hinge for the adjacent end of the said auxiliary line 22 with relation to the attachment 24, causing said eye 31 to shift along the rounded corner defined by said blunt end 26 and the said flat surface 28, as at 33 in FIG. 4, thereby permitting said eye 31 to assume a perpendicular relation with said attachment 24 and bight 12, as is seen in FIG. 2. This change of position of said eye 31 will however not dislocate said eye 31 in a lateral direction with relation to said attachment 24, and consequently will not alter the central co-planar relation of coil 32 and of the adjacent end of said auxiliary line 22 with relation to the longitudinal axis with the hook, as was hereinabove described. This result will ensue particularly when eye 31 is made of a rather stiff material such as gut.

It is noted that the bottom edge of the body 25, beginning with its end which is proximate to the hook proper 13, gradually flares away from and in a diverged relation with the adjacent portion of bight 12, thereby obviating any interference with the fish taking the hook.

While there are described herein preferred embodiments of the present invention, it is nevertheless to be understood that minor changes may be made therein without departing from the spirit and scope of the invention as claimed.

What I claim as new is:

1. In a fishhook including an elongated shank, a hook point and an intermediately disposed bight portion, a device for dislodging and extracting a fishhook from fish body tissues comprising an oblong body depending from said bight in a plane passing through the longitudinal axis of said shank and said bight portion, said body having an aperture therethrough transverse to said plane and spaced outwardly from said bight portion and being positioned between the shank and a line located in said plane parallel to said shank and midway between said shank and said hook point, flexible means having one end thereof passing through said aperture encircling a portion of said body and secured to itself rearwardly of said body beneath said bight and lying in said plane to dispose said flexible means substantially within said plane and adjacent said shank.

2. In a fishhook including an elongated shank, a hook point and an intermediately disposed bight portion, a device for dislodging and extracting a fishhook from fish body tissues comprising an oblong body depending from said bight in a plane passing through the longitudinal axis of said shank and said bight portion, said body having an aperture therethrough transverse to said plane and spaced outwardly from said bight portion and being positioned between the shank and a line located in said plane parallel to said shank and midway between said shank and said hook point, flexible means having one end thereof passing through said aperture encircling a portion of said body and secured to itself rearwardly of said body beneath said bight and lying in said plane to dispose said flexible means substantially within said plane and adjacent said shank, said body having a pair of leaves formed integrally therewith and extending from the sides thereof, said leaves and the surface of the body disposed between said leaves defining a cradle to embrace a peripheral portion of said bight portion of said hook for securing said body to said hook.

References Cited in the file of this patent

UNITED STATES PATENTS

| | | |
|---|---|---|
| 2,385,274 | Hammond | Sept. 18, 1945 |
| 2,618,881 | Gorrias | Nov. 25, 1952 |
| 2,815,603 | Bandemer | Dec. 10, 1957 |
| 2,816,392 | Goldberg et al. | Dec. 17, 1957 |
| 2,823,486 | Behee | Feb. 18, 1958 |